Nov. 26, 1929.  E. H. LORENZ  1,737,165
ADJUSTABLE CAM MECHANISM FOR GLASS FEEDING APPARATUS
Filed May 11, 1926  2 Sheets-Sheet 1

INVENTOR
EDWARD H. LORENZ
By Robson A. Brown
Attorney

Nov. 26, 1929. E. H. LORENZ 1,737,165
ADJUSTABLE CAM MECHANISM FOR GLASS FEEDING APPARATUS
Filed May 11, 1926 2 Sheets-Sheet 2

INVENTOR
EDWARD H. LORENZ
By Robson D Brown,
Attorney

Patented Nov. 26, 1929

1,737,165

UNITED STATES PATENT OFFICE

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE

ADJUSTABLE CAM MECHANISM FOR GLASS-FEEDING APPARATUS

Application filed May 11, 1926. Serial No. 108,231.

My invention relates to apparatus for feeding molten glass from a container, to form mold charges, and relates more particularly to feeders of that type in which a cam-operated reciprocating plunger projects into the glass over an outlet in the container, and in which shears operate beneath the outlet, and in timed relation with the movements of the plunger, to sever the discharged glass into mold charges of predetermined size and shape.

In glass feeding apparatus of this type, it is desirable to provide means for adjusting the timed relation or phase relation between the plunger's stroke and the shearing operation, and this adjustment has been obtained by changing the relative positions of the plunger-operating cam and the shear-operating cam, so as to cause the plunger's stroke to occur earlier or later with respect to the shear cut.

My invention has for its object the provision of a simplified and improved form of phase changing apparatus and one which will permit greater amplitude of adjustment than in the case of the devices heretofore employed.

This invention constitutes an improvement upon my copending application, Serial No. 69,756, filed November 18, 1925, and a copending application of Karl E. Peiler, Serial No. 683,576 filed December 31, 1923.

Figure 1:
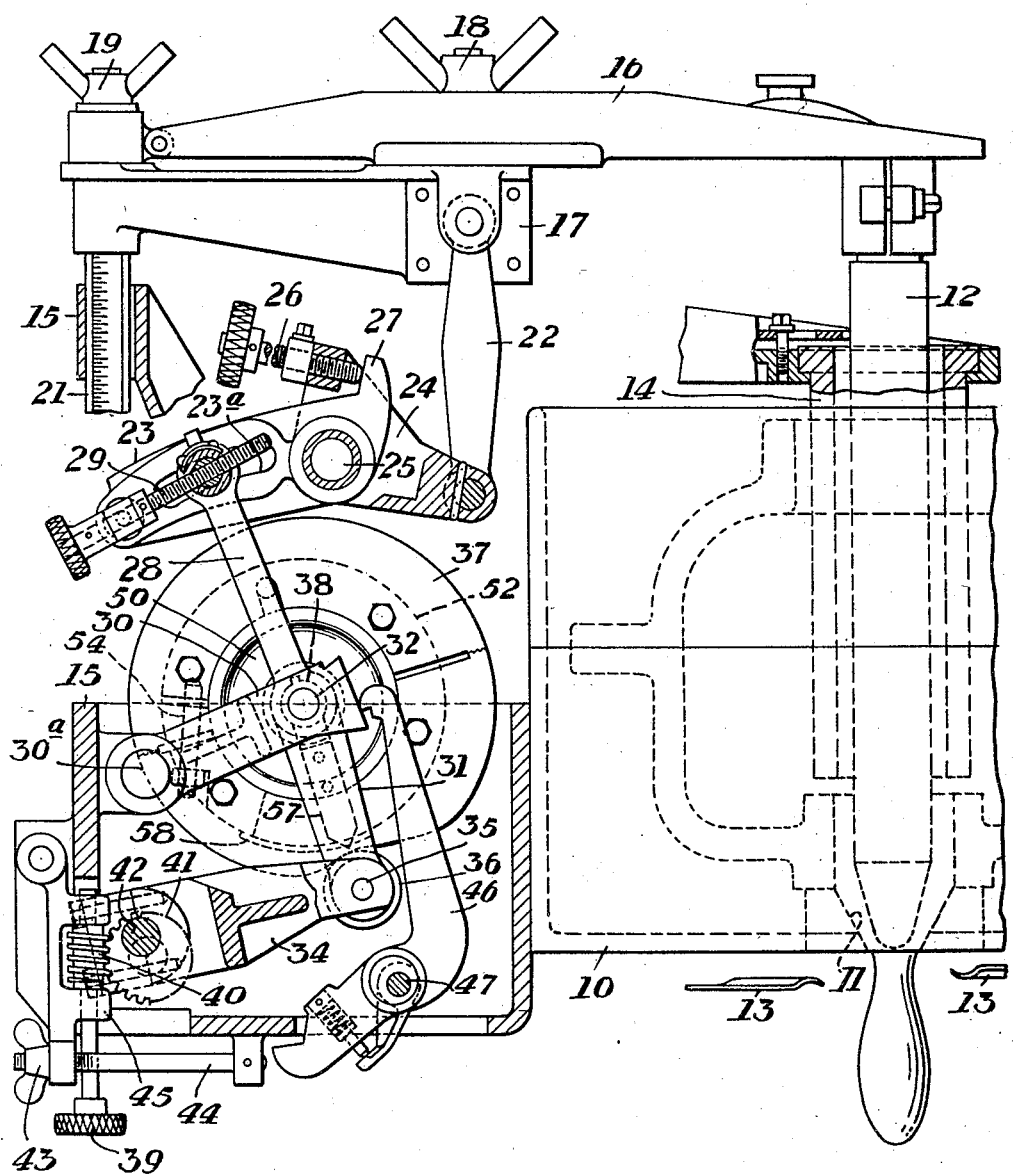
Figure 2:
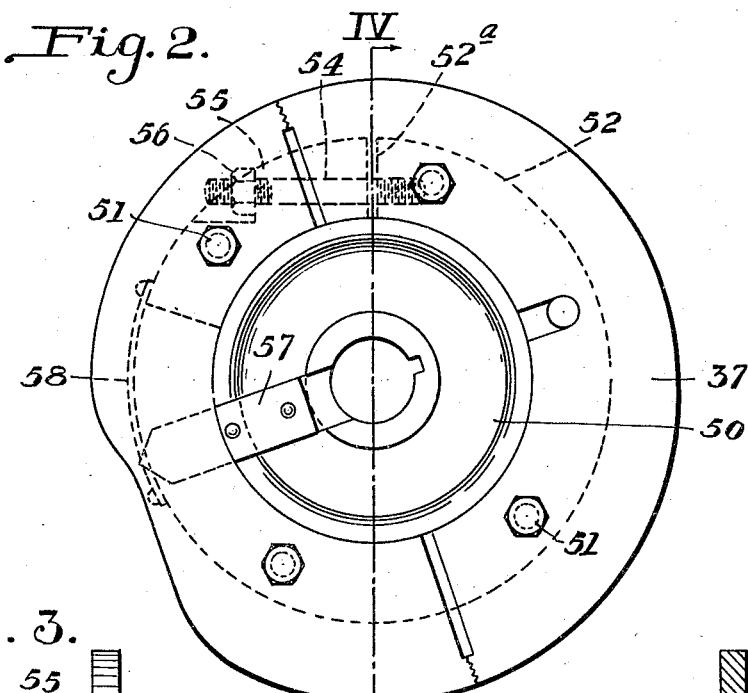
Figure 3:
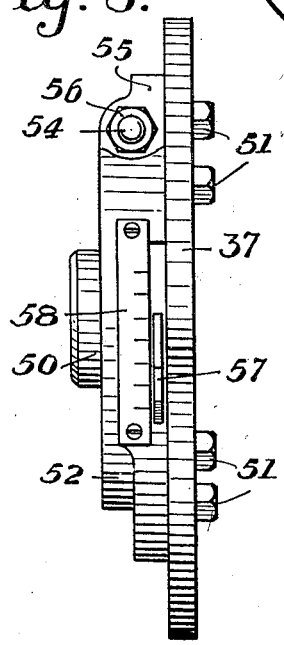
Figure 4:
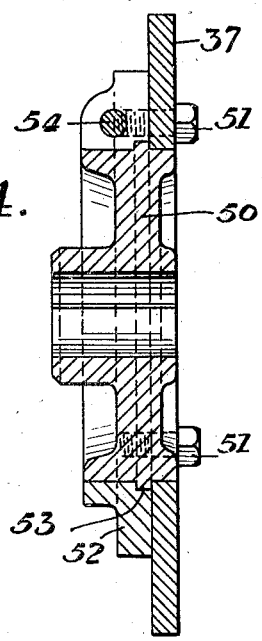

Referring to the drawings, Fig. 1 is an elevational view partially in section, showing an assembly of apparatus constructed in accordance with this invention; Fig. 2 is a view, on an enlarged scale, of the plunger-operating cam of Fig. 1 and certain of its associated parts; Fig. 3 is an edge elevational view of the device of Fig. 2, and Fig. 4 is a view taken on the line 4—4 of Fig. 2.

In the drawings, a glass container 10, which may be the forehearth of a glass melting furnace, has a discharge outlet 11 located in its bottom. The delivery of mold charges through the outlet 11 is controlled by a reciprocating plunger 12 and shears 13 are operated in timed relation with the reciprocations of the plunger, as hereinafter described, to sever the mold charges from the discharged glass. The plunger 12 may be surrounded by a vertically adjustable tube 14 for regulating the quantity of glass supplied to the outlet 11. The plunger-operating mechanism is supported by a frame 15 which may form a part of the forehearth frame.

The plunger 12 is secured to an arm 16 which is mounted on a supporting bracket 17 by means of wing nuts 18 and 19. The plunger 12 is maintained in alignment with the outlet during reciprocation by a guide pin 21 which enters a recess provided in the frame 15.

The plunger mounting is connected by a link 22 with a two-part lever consisting of arms 23 and 24, which arms are held in adjusted relation about the pivot 25 by an adjusting screw 26 carried by the section 24 and engaging a projection 27 on the arm 23. The arm 23 is slotted to connect with an actuating member which, in this case, is a link 28 forming part of the plunger-drive mechanism to be described below. An adjusting screw 29 is provided for shifting the upper end of the arm 28 along a slot 23ª in the arm 23.

The link 28 is pivotally connected to an arm 30 which is in turn pivotally connected at 30ª to the frame 15. A link 31 has hinge connection at 32 with the link 28 and the arm 30.

The lower end of the link 31 is pivotally connected to a bracket 34 by means of a pin 35 that also carries a roller 36. A cam or disc 37 which will hereinafter be fully described, cooperates with the roller 36 to effect vertical reciprocation of the plunger 12, by reason of the connections between such plunger and the links 28—31 above described.

The cam or disc 37 is mounted upon a shaft 38 that is driven from any suitable source of power. The shaft 38 may also conveniently carry a cam (not shown) for operating the shear blades 13, through the agency of any usual form of connections employed in apparatus of this character and well known in the art. Variance in timed relation between the shear-operating cam and the plunger-operating cam 37 will be effected by adjusting the position of the roller 36 circumferentially of the cam 37, by rotatably adjusting the cam disc on the shaft 38, or by combining such adjustments.

Adjustment of the roller 36 is effected by shifting the bracket 34 by a handwheel 39 that operates a worm 40 which meshes with a pinion 41. The pinion 41 is eccentrically mounted on a shaft 42 that has an eccentric portion which supports the rear end of the bracket 34. As the handwheel 39 is rotated, the roller 36 will therefore be carried forwardly or backwardly, as desired, to vary the period at which the movements of the plunger will be effected with relation to the rotation of the shaft 38, and consequently with relation to the shear-operating cam that is carried thereby. The worm 40 can be held against accidental rotation by means of a thumb nut 43 that is carried by a bolt 44, and utilized to force the bracket 45 in which the worm 40 is journaled, toward the pinion 41, thus effecting a binding engagement between the worm and the pinion.

A latch 46 is provided for holding the plunger-operating mechanism in inoperative position, with the plunger elevated, when desired. The latch is mounted upon a shaft 47 that may be rotated in order to move the upper hooked end of the plunger into and out of engagement with the outer end of the arm 30.

Referring now to Figs. 2, 3 and 4, I show means for effecting adjustment of the cam disc 37 circumferentially of the shaft 38, in order to supplement the adjustment of the cam roller 36 or to be used alternatively therewith. The cam 37 is made in two sections that are supported by a cam hub 50 that is keyed to the shaft 38. The cam is held against displacement by screws 51 that have threaded engagement with a cam holder 52. The hub 50 is provided with a circumferential rib 53 that serves as an abutting surface for holding the disc 37 and its holder 52 in proper axially and radially aligned positions upon the shaft 38.

The holder 52 is of ring-like form, but cut away as indicated at 52ᵃ so that it may be contracted to engage the hub 50 and prevent rotation of the cam holder relative to the hub. Contraction of the holder 52 is effected by a rod 54 whose one end has threaded engagement with an opening in one end of the holder and whose other end extends through a perforated shoulder portion 55 on the other end of the holder. A nut 56 engages the outer end of the rod or bolt 54 and seats against the shoulder 55 so that it will contract the holder 52 when turned in one direction, and permit expansion thereof when unscrewed. The sections of the cam 37 are in slightly spaced relation when the holder is expanded, so as to permit contraction of the holder when the nut 56 is tightened.

When making adjustments of the disc 37, the nut 56 is loosened to permit turning of the holder 52 and disc 37 on the hub after which the nut is again tightened.

The hub 50 has a pointer 57 secured thereto. This pointer extends through a slot in the holder 52 so that its outer end lies adjacent to a graduated plate or scale 58. Since the pointer is secured to the hub 50, which is fixed on the shaft 38, and the plate 58 is carried by the disc holder 52, the location of the pointer with respect to the scale 58 will show the circumferentially adjusted position of the disc 37 upon the shaft.

I claim as my invention:

1. In a glass-feeding apparatus, a cam disc for operating a glass discharge-regulating implement, a driving shaft for said disc, a hub carried by the shaft, a cam holder to which the cam disc is secured, and means for permitting expansion of the cam holder to permit adjustment of the disc circumferentially of the hub and for contracting the cam holder upon the hub to secure the disc in adjusted position on said hub.

2. In a glass-feeding apparatus, a cam disc for operating a glass discharge-regulating implement, a driving shaft for said disc, a hub carried by the shaft, a cam holder to which the cam disc is secured, and means for adjustably positioning the cam holder circumferentially of the hub for adjustment angularly about the axis of the shaft throughout the entire circumference of the shaft or any part thereof.

3. In a glass-feeding apparatus, a cam disc for operating a glass discharge-regulating implement, a driving shaft for said disc, a hub carried by the shaft, and having an annular flange on its periphery, a cam holder, means for securing said disc and cam holder together in abutting relation with opposite sides of said flange, and means for securing the cam holder in circumferentially adjusted position on said hub.

4. In a glass-feeding apparatus, a cam disc for operating a glass discharge-regulating implement, a driving shaft for said disc, a hub carried by the shaft, a cam holder to which the cam disc is secured, and means for permitting expansion of the cam holder to permit adjustment of the disc circumferentially of the hub and for contracting the cam holder upon the hub to secure the cam disc in adjusted position on said hub, the said cam disc being expansible and contractible with the cam holder.

5. In a glass-feeding apparatus, a cam disc for operating a glass discharge-regulating implement, a driving shaft for said disc, a hub carried by the shaft, a cam holder to which the cam disc is secured, means for permitting expansion of the cam holder to permit adjustment of the disc circumferentially of the hub and for contracting the cam holder upon the hub to secure the cam disc in adjusted position on said hub, a pointer secured to the hub, and a scale carried by the cam holder.

6. In a glass-feeding apparatus, a cam disc for operating a glass discharge-regulating implement, a driving shaft for said disc, a hub carried by the shaft, a cam holder to which the cam disc is secured, said cam holder being of substantially annular form but having spaced ends, a rod threaded into one of said ends and extending across the space between said ends through an opening in the second end of said cam holder, and a nut engaging the extending portion of the rod and the other end of the holder, to control contraction and expansion of the holder with respect to the hub.

7. In glass feeding apparatus, a rotary hub having a pair of spaced circumferentially extending seats in its periphery, a split ring cam holder practically encircling said hub and received in one of said seats, a cam disc encircling said hub and received in the other seat, means securing said cam disc to said cam holder, and adjustable means connecting the ends of said cam holder for releasably securing said cam holder in clamping relation to the hub.

Signed at Hartford, Conn., this 6th day of May, 1926.

EDWARD H. LORENZ.